United States Patent [19]

Nakamura et al.

[11] Patent Number: 5,256,433
[45] Date of Patent: Oct. 26, 1993

[54] PROCESS FOR IMPROVING FISH MEAT QUALITY

[75] Inventors: Makoto Nakamura; Norihisa Nishi; Hiroki Saeki, all of Tokyo; Satoshi Noguchi, Kodaira; Hirotada Ozaki, deceased, late of Yokohama, by Chiyoko Ozaki, legal representative, Yokohama, all of Japan

[73] Assignee: Taiyo Fishery Co., Ltd., Tokyo, Japan

[21] Appl. No.: 263,638

[22] Filed: Oct. 27, 1988
(Under 37 CFR 1.47)

[30] Foreign Application Priority Data

Jul. 28, 1987 [JP] Japan .................. 62-188588

[51] Int. Cl.$^5$ ............................. A23L 1/325
[52] U.S. Cl. ...................... 426/289; 426/643
[58] Field of Search ................... 426/289, 643

[56] References Cited

U.S. PATENT DOCUMENTS

| | | | |
|---|---|---|---|
| 3,863,017 | 1/1975 | Yueh | 426/643 |
| 4,221,819 | 9/1980 | Falci et al. | 426/643 |
| 4,464,404 | 8/1984 | Ueno et al. | |
| 5,006,353 | 4/1991 | Nishi et al. | 426/643 |

FOREIGN PATENT DOCUMENTS 61-198543  8/1986  Japan .

OTHER PUBLICATIONS

English language Abstract of JP 55104846.
English language Abstract of JP 58056661.
English language Abstract of JP 58098061.

*Primary Examiner*—Helen F. Pratt
*Attorney, Agent, or Firm*—Frishauf, Holtz, Goodman & Woodward

[57] ABSTRACT

A process for improving fish meat quality which comprises treating fish meat or minced fish meat with a 0.01 to 10 mM aqueous solution of a calcium salt, dehydrating said fish meat or minced fish meat to thereby give a moisture content of 70 to 90%, and then adding 0.1 to 10%, in terms of dry matters, of one or more materials selected from among plasma protein (or serum protein), albumen and cow's milk thereto. According to this process, not only the elasticity and water holding property of the fish meat or minced fish meat but also the taste, flavor, color and odor of the same can be improved.

17 Claims, No Drawings

PROCESS FOR IMPROVING FISH MEAT QUALITY

BACKGROUND OF THE INVENTION

1. Field of the Invention

This invention relates to a process for improving the quality, in particular, elasticity and water holding property of fish meat. More particularly, it relates to a process for improving fish meat quality including elasticity and water holding property of fishes which have been ranked low in the raw materials for processed fishery foods to thereby utilize these fishes in the production of fishery foods.

2. Description of the Prior Art

Because of recent restriction on fishing areas, it has been urgently required to utilize inshore small fishes and heretofore unused fishes.

However these fishes including hake, silver hake, sardine and bonito are ranked low in the raw materials for processed fishery foods and are disadvantageous from the economic viewpoint, since each of these fish posseses peculiar properties and shows significantly poor elasticity and water holding property, which are essential for the raw materials for processed fishery foods, when processed into fillets, minced meat or surimi (ground meat).

Therefore the present inventors have proposed an effective process for improving fish meat quality by using serum or plasma (cf. Japanese Patent Application No. 61-198543/8-25-1986) to thereby improve the quality, including elasticity and water holding property of fish meat, which has been ranked low in the raw materials for processed fishery foods. Thus the inventors have succeeded in the preparation of an excellent gel from a fish which has never been utilized so far. However it is further required to improve the quality of the gel in order to obtain a product of a high commercial value.

SUMMARY OF THE INVENTION

The present inventors have conducted extended studies in order to improve the meat quality of fishes which have been scarcely utilized hitherto, for example, hakes, such as hake and silver hake, sardine, bonito and shark. As a result, they have found that the elasticity and water holding property of hake meats can be significantly improved by combining leaching with an aqueous solution of a calcium salt with the abovementioned process for improving fish meat quality and that the stability of the quality of a product obtained from these fish meats can be enhanced thereby.

The present invention has been completed based on these findings. Accordingly the present invention solves the abovementioned problems by providing a process for improving fish meat quality which comprises treating fish meat or minced fish meat with a 0.01 to 10 mM aqueous solution of a calcium salt, dehydrating said fish meat or minced fish meat to thereby adjust the moisture content thereof to 70 to 90% and then adding 0.1 to 10%, in terms of dry matters, of one or more materials selected from among plasma protein (or serum protein), albumen and cow's milk thereto.

According to the process for improving fish meat quality of the present invention, elasticity and water holding property of fish meat or minced fish meat can be significantly improved by treating said fish meat or minced fish meat with an aqueous solution of a calcium salt, dehydrating the fish meat or minced fish meat and adding inhibitor(s) thereto. It further improves the taste, flavor, color and odor of the fish meat or minced fish meat. Namely the process of the present invention, which enables the efficient utilization of fishes which have been ranked low in raw materials for processed fishery foods, such as silver hake, hake, sardine and bonito, is highly valuable, not only from the viewpoint of the food industry, but also from that of the utilization of resources.

DETAILED DESCRIPTION OF THE INVENTION

The process of the present invention is highly effective not only on hake, silver hake, sardine and bonito, but also on various pollacks including Alaska pollack and, in particular, hakes such as Merluccius, *Merluccius capensis, Merluccius australis, Merluccius hubbsi,* Macruronus, Micromesistinum and Pseudophycis.

The form of the fish meat to be treated according to the process of the present invention is not particularly restricted. It may be in the form of, for example, fillets, minced meat or surimi.

The calcium salt to be used in the process of the present invention is not particularly restricted, though calcium chloride is preferable from the viewpoint of treatabilities such as solubility.

The inhibitor(s) to be used in the process of the present invention are selected from among plasma protein (or serum protein), albumen and cow's milk as well as components extracted therefrom. A dry powder thereof is particularly preferable from the viewpoint of treatability. Plasma and serum may be employed as the sources for plasma protein and serum protein, respectively.

Thus the process for improving fish meat quality of the present invention may be carried out in the following manner. The abovementioned fish meat or minced fish meat is treated with the abovementioned aqueous solution of a calcium salt and dehydrated. Then the abovementioned inhibitor(s) are added thereto. The treatment with the aqueous calcium salt solution may be effected by leaching said fish meat or minced fish meat with said aqueous solution or injecting the latter into the former. The addition of the inhibitor(s) may be carried out by dissolving the same in water and injecting the resulting solution into the fish meat or minced fish meat.

The fish meat or minced fish meat may be leached with the calcium salt solution once to ten times, preferably twice to six times, as much as the fish meat or minced fish meat. The leaching solution may contain 0.01 to 10 mM, preferably 0.1 to 5 mM, of the calcium salt. The inhibitor(s) are added after adjusting the moisture content of the leached fish meat or minced fish meat to 70 to 90% by dehydration. The inhibitor(s) may be added thereto in an amount of 0.01 to 15%, in terms of dry matters, preferably 0.1 to 5%, in terms of dry matters, based on the abovementioned fish meat or minced fish meat.

When the amount of the leaching solution, the calcium salt or the inhibitor(s) is below the lower limit each as defined above, the desired effects cannot be achieved. When it exceeds the upper limit, on the other hand, some undesirable phenomena such as coagulation or coloration of protein or the appearance of undesirable odor or undesirable taste would be observed. When the moisture content of the fish meat or minced fish meat is less than 70%, the process cannot be desirably carried out in practice, since the homogeneous addition of the additives to the dehydrated fish meat becomes difficult. When it exceeds 90%, on the other hand, the excessively high moisture content is undesirable, except in some specific cases, for example, treating krill meat.

A small amount of the calcium salt may be added to the dehydrated meat after carrying out the rinsing or injection. However, the effects of the leaching with the calcium salt in the process of the present invention become remarkable when the calcium salt is added at the leaching stage. Although the inhibitor(s) may be added at the leaching stage, it is impossible to completely remove protease from the fish meat by leaching alone in the case of some fishes including demerrel hakes. Thus the residual protease would exert its effect during the final heating stage. Accordingly it is preferable in the process of the present invention to add the inhibitor(s) prior to the final heating stage, namely, after the leaching and dehydration.

When the fish meat is in the form of dresses or fillets, the inhibitor(s) may be added thereto by injection or tambling dipping. Thus the fish meat quality can be significantly improved.

To further illustrate the process for improving fish meat quality of the present invention, the following Referential Examples and Examples will be given.

REFERENTIAL EXAMPLE 1

A silver hake meat contaminated with Sporazoa and one not contaminated therewith (the former being soluble when incubated at 45° to 50° C. for 60 minutes, while the latter being insoluble under the same conditions) were leached each with a calcium salt at various concentrations. As a result, it was confirmed that the leaching with an aqueous solution of calcium chloride ($CaCl_2$—$2H_2O$ 1mM) caused an obvious increase in the gel elasticity, though the extent thereof somewhat varied depending on the degree of the contamination. For example, the gel elasticity achieved without using any calcium salt was 4 mm×50 g, suggesting that this product cannot be called a gel in the strict sense of the word. In contrast thereto, the one leached with 1 mM of the calcium salt showed a gel elasticity of 11 mm×400 g.

REFERENTIAL EXAMPLE 2

The same materials as; those used in the Referential Example 1 were leached with water containing no calcium salt in a conventional manner and then various inhibitors were added thereto at various concentrations. As a result, the addition of approximately 2% of inhibitor(s) elevated the gel elasticity of a fish meat, which was contaminated with Sporazoa and considerably dissolved, up to 8 mm×300 g. In contrast thereto, the same fish meat to which no inhibitor had been added showed a gel elasticity of 4 mm×50 g. In order to achieve the equivalent weight, in terms of dry matters, sorbitol as much as the added inhibitor(s) was added in the control lot.

EXAMPLE 1

The same materials as those used in the Referential Example 1 were leached in the same manner as the one described therein and then the moisture content of each material was adjusted to 80%. Subsequently 0.1 to 10% of plasma, serum, albumen or cow's milk, each in the form of a spray-dried or lyophilized product, was added thereto as an inhibitor. In the 2% lot, even the highly contaminated fish meat showed an elevated gel elasticity of 15 mm×1350 g (in the case of the plasma), 14 mm×1400 g (in the case of the serum), 12 mm×1100 g (in the case of the albumen) or 14 mm×1050 g (in the case of the cow's milk). Thus the elasticity of each fish meat was significantly elevated and simultaneously the color, taste and odor of the same were also improved.

EXAMPLE 2

The procedure of Example 1 was applied to Pacific hake, Micromesistius and Macruronus. As a result, the combined use of the calcium salt with the inhibitor(s) synergistically improved the fish meat quality.

EXAMPLE 3

The procedure of Example 1 was applied to sardine and bonito. As a result, the gel elasticity thereof was elevated to 11–16 mm×500–1200 g under certain conditions, though the degree of the improvement was inferior to those observed in the case of hakes.

What is claimed is:

1. A process for improving fish meat quality which comprises treating fish meat or minced fish meat with a 0.01 to 10 mM aqueous solution of a calcium salt, dehydrating said fish meat or minced fish meat to thereby result in a moisture content of 70 to 90%, and then adding 0.1 to 10%, in terms of dry matter, based on the weight of the fish meat or minced fish meat, of one or more materials selected from the group consisting of plasma protein, serum protein, albumen and cow's milk.

2. The process for improving fish meat quality as set forth in claim 1, wherein the treatment with said aqueous calcium salt solution comprises rinsing said fish meat or minced fish meat with said aqueous solution.

3. The process for improving fish meat quality as set forth in claim 1, wherein said treatment with said aqueous calcium salt solution comprises injecting said aqueous solution into said fish meat or minced fish meat.

4. The process for improving fish meat quality as set forth in claim 1, wherein the calcium salt is calcium chloride.

5. The process for improving fish meat quality as set forth in claim 1, wherein 0.1 to 5%, in terms of dry matter, of said one or more materials is added.

6. The process for improving fish meat quality as set forth in claim 1, wherein the fish meat is from a fish selected from the group consisting of hake, sardine, bonito, shark and pollack.

7. The process for improving fish meat quality as set forth in claim 6, wherein the fish is pacific hake.

8. The process for improving fish meat quality as set forth in claim 6, wherein the fish is silver hake.

9. The process for improving fish meat quality as set forth in claim 6, wherein the fish is Alaska pollack.

10. The process for improving fish meat quality as set forth in claim 6, wherein the fish is selected from the group consisting of Merluccius, Macruronus, Micromesistinum and Pseudophycis.

11. The process for improving fish meat quality as set forth in claim 1, wherein the fish is selected from the group consisting of *Merluccius capensis, Merluccius australis* and *Merluccius hubbsi.*

12. The process for improving fish meat quality as set forth in claim 1, wherein the aqueous solution contains 0.1 to 5 mM of the calcium salt.

13. The process for improving fish meat quality as set forth in claim 2, wherein the calcium salt is calcium chloride and the fish meat is from a fish selected from the group consisting of hake, sardine, bonito, shark and pollacks.

14. The process for improving fish meat quality as set forth in claim 2, wherein the moisture content is 80%; the calcium salt is calcium chloride and the fish meat is from a fish selected from the group consisting of silver hake, Pacific hake, Micromesistius and Macruronus.

15. The process for improving fish meat quality as set forth in claim 3, wherein the calcium salt is calcium chloride and the fish meat is from a fish selected from the group consisting of hake, sardine, bonito, shark and pollacks.

16. A process for improving fish meat quality which comprises treating fish meat or minced fish meat from a fish selected from the group consisting of hake, sardine, shark and pollack with 0.1 to 5 mM aqueous solution of calcium chloride, dehydrating said fish meat or minced fish meat to thereby result in a moisture content of 70 to 90% and then adding thereto 0.1 to 5%, in terms of dry matter, based on the weight of the fish meat or minced fish meat, of one or more materials selected from the group consisting of plasma protein, serum protein, albumen and cow's milk.

17. A process for improving fish meat quality which comprises treating fish meat or minced fish meat from a fish selected from the group consisting of hake, sardine, shark and pollack with 0.1 to 10 mM aqueous solution of calcium chloride, dehydrating said fish meat or minced fish meat to thereby result in a moisture content of 70 to 90% and then adding thereto 0.01 to 15%, in terms of dry matter, based on the weight of the fish meat or minced fish meat, of one or more materials selected form the group consisting of plasma protein, serum protein, albumen and cow's milk.

* * * * *